United States Patent
Strong

[15] 3,696,199
[45] Oct. 3, 1972

[54] USE OF 2-ARYL-3-ALKYLAMINOACRYLONITRILES AS FUNGICIDES

[72] Inventor: Jerry G. Strong, Westfield, N.J.
[73] Assignee: Mobil Oil Corporation
[22] Filed: Sept. 25, 1970
[21] Appl. No.: 75,757

[52] U.S. Cl. .................................424/304, 424/302
[51] Int. Cl. .............................................A01n 9/20
[58] Field of Search ..................424/304; 260/465 E

[56] References Cited

UNITED STATES PATENTS 3,478,105  11/1969  Kuderna, Jr. et al. ...71/118 X
3,538,226  11/1970  Ozaki et al.................424/304

OTHER PUBLICATIONS

Bielstein Band X (syst. No. 1290) page 690, 1927
Porai–Koshits et al. Chem. Abst. Vol. 64, pages 8168–8169 1966.

*Primary Examiner*—Jerome D. Goldberg
*Assistant Examiner*—Allen J. Robinson
*Attorney*—Oswald G. Hayes, Andrew L. Gaboriault and Mitchell G. Condos

[57] ABSTRACT

Certain 2-aryl-3-alkylaminoacrylonitriles form a new class of fungicides. They are highly effective as soil fungicides against Fusarium oxysporium, Pythium debaryanum, Rhizoctonia solani and Sclerotium rolfsii.

20 Claims, No Drawings

USE OF 2-ARYL-3-ALKYLAMINOACRYLONITRILES AS FUNGICIDES

BACKGROUND OF THE INVENTION

1. Field of the Invention

This invention is directed to the novel use of certain 2-aryl-3-alkylaminoacrylonitriles as fungicides.

2. Description of the Prior Art

3-Methylamino-2-phenylacrylonitrile and 3-(N,N-dimethylamino)-2-(p-nitrophenyl)acrylonitrile, compounds useful for practice of the present invention, are known to the art (Walther and Schickler, *J. fur Pracktische Chem.* [2]55, 338 (1897) and Porai-Koshits, Kvitko and Shutkova, *Latvijas PSR Zinatnu Akad. Vestis, Kim. Ser.* [5], 587–92 (1965), respectively).

U.S. Pat. No. 3,478,105 discloses the use of 3-alkylaminoatroponamides as herbicides.

SUMMARY OF THE INVENTION

This invention provides a method for combatting fungi which comprises contacting the fungi with at least one compound having the formula:

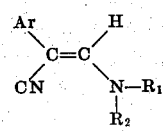

wherein Ar is a member selected from the group consisting of (1) an aromatic, a heteroaromatic, a combination of aromatic and heteroaromatic, and (2) a member of group (1) containing at least one substituent selected from the group consisting of halogen, thiocyanato, $NO_2$, alkoxy (e.g., $C_1$–$C_4$), haloalkyl (e.g., $C_1$–$C_4$), aryl, substituted aryl, aroyl, cyano, alkylmercapto (e.g., $C_1$–$C_4$), alkyl sulfonyl (e.g., $C_1$–$C_4$), aryl sulfonyl, haloalkyl sulfonyl (e.g., $C_1$–$C_4$), carbalkoxy (e.g., $C_2$–$C_5$), dialkylamino (e.g., $C_1$–$C_4$), amide, alkyl (e.g., $C_1$–$C_6$), and cycloalkyl (e.g., $C_3$–$C_6$), $R_1$ is a member selected from the group consisting of hydrogen, alkyl (e.g., $C_1$–$C_6$), alkenyl (e.g., $C_2$–$C_8$), alkynyl (e.g., $C_2$–$C_8$), and cycloalkyl, $R_2$ is a member selected from the group consisting of alkyl (e.g., $C_1$–$C_6$), alkenyl (e.g., $C_2$–$C_8$), alkynyl (e.g., $C_2$–$C_8$), and cycloalkyl, and wherein $R_1$ and $R_2$ are alkylene which, together with N, form a ring of at least 3, but not more than 6 members; and fungicidal compositions comprising at least one such compound and a carrier therefor.

DESCRIPTION OF SPECIFIC EMBODIMENTS

As will be noted from the above formula, the compounds for use as fungicides in the present invention are 2-aryl-3-alkylaminoacrylonitriles. Non-limiting examples of the compounds disclosed for use as fungicides in this invention include:

3-methylamino-2-phenylacrylonitrile,
3-ethylamino-2-(p-chlorophenyl)acrylontrile,
3-methylamino-2-(p-nitrophenyl)acrylontrile,
3-(N,N-dimethylamino)-2-phenylacrylonitrile,
3-(N-methyl-N-ethylamino)-2-phenylacrylonitrile,
3-(sec-butylamino)-2-(3-pyridyl)acrylontrile,
3-(sec-butylamino)-2-(p-fluorophenyl)acrylonitrile,
3-(n-butylamino)-2-(2-furanyl)acrylonitrile,
3-(sec-butylamino)-2-(m-chlorophenyl)acrylontrile,
3-ethylamino-2-(2-benzfuranyl)acrylonitrile,
3-(sec-butylamino)-2-(p-nitrophenyl)acrylonitrile,
3-methylamino-2-(2-thenoyl)acrylonitrile,
3-(sec-butylamino)-2-(p-cyanophenyl)acrylonitrile,
3-(iso-butylamino)-2-(p-isopropylphenyl)acrylonitrile,
3-(sec-butylamino)-2-(p-dimethylaminophenyl)acrylonitrile,
3-ethylamino-2-(m-nitro-p-chlorophenyl)acrylontrile,
3-aziridinyl-2-phenylacrylonitrile,
3-pyrrolidinyl-2-phenylacrylonitrile,
3-piperidinyl-2-phenylacrylonitrile,
3-(sec-butylamino)-2-(p-ethoxyphenyl)acrylonitrile,
3-(sec-butylamino)-2-(p-ethylmercaptophenyl)acrylonitrile,
3-(n-butylamino)-2-(p-ethylsulfonylphenyl)acrylonitrile,
3-(sec-butylamino)-2-phenylacrylonitrile,
3-methylamino-2-(2,4-dichlorophenyl)acrylonitrile,
3-isopropylamino-2-(p-fluorophenyl)acrylonitrile,
3-isopropylamino-2-(p-chlorophenyl)acrylonitrile,
3-(tert-butylamino)-2-(p-fluorophenyl)acrylonitrile,
3-(tert-butylamino)-2-phenylacrylonitrile,
3-(n-butylamino)-2-(p-chlorophenyl)acrylonitrile,
3-(n-butylamino)-2-phenylacrylonitrile,
3-methylamino-2-(p-fluorophenyl)acrylonitrile,
3-(n-pentylamino)-2-(p-nitrophenyl)acrylonitrile,
3-cyclopentylamino-2-(p-chlorophenyl)acrylonitrile,
3-ethenylamino-2-(p-fluorophenyl)acrylonitrile,
3-methylamino-2-(p-methylphenyl)acrylontrile,
3-allylamino-2-(p-bromophenyl)acrylonitrile, and
3-cyclopropylamino-2-phenylacrylonitrile.

The compounds of this invention are readily prepared by the general procedure:

An appropriate 2-aryl-3-alkyloxyacrylonitrile is reacted with an appropriate alkylamine in the presence of a suitable reaction medium, e.g. an alkyl alcohol. After a suitable time, the reaction solution is concentrated and water is added while hot. The precipitate formed on cooling is collected, washed with water and dried by an appropriate means to yield a solid product.

The following examples, demonstrate the typical procedure:

EXAMPLE 1

3-Methylamino-2-phenylacrylonitrile

A solution of 104 g. (0.6 mole) of 3-ethoxy-2-phenylacrylonitrile and 118 g. (1.2 mole) of 40 percent aqueous methyl-amine in 600 ml of 95 percent ethyl alcohol was shaken in a closed bottle for overnight. The reaction solution was concentrated to 500 ml and 200 ml of water was added while hot. A white solid which separated on cooling was collected, washed with water and dried to give 83 g. of 3-methylamino-2-phenylacrylonitrile with a melting point of 101°–102° C. IR analysis of the example compound verified the proposed structure (Table I).

Elemental Analysis of the compound of Example 1

Calcd. for $C_{10}H_{10}N_2$: C,75.92; H,6.37. Found: C,75.58; H,6.45.

The reaction of Example 1 may be diagrammed as follows:

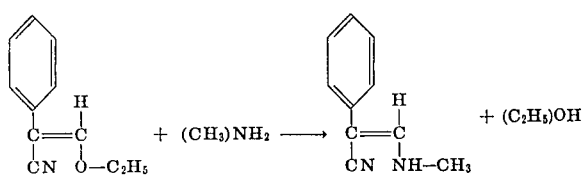

EXAMPLE 2

3-Isopropylamino-2-phenylacrylonitrile

A 5.2 g. (0.03 mole) portion of 3-ethoxy-2-phenylacrylonitrile and 25 g. of 40 percent aqueous isopropylamine in 60 ml of ethyl alcohol were allowed to react according to Example 1. Obtained following recrystallization from ethanol - water was 2.1 g. of 3-isopropylamino-2-phenylacrylonitrile with a melting point of 93°–93.5° C. IR analysis of the example compound verified the proposed structure (Table I).

EXAMPLE 3

3-Methylamino-2-(p-chlorophenyl)acrylonitrile

A mixture of 6.2 g. (0.03 mole) of 3-ethoxy -2-(p-chlorophenyl)acrylonitrile, 25 ml of 40 percent aqueous methylamine and 60 ml of ethyl alcohol was allowed to react according to Example 1. Obtained was 4.4 g. of 3-methylamino-2-(p-chlorophenyl)-acrylonitrile with a melting point of 169.5°–170°C. IR analysis of the example compound verified the proposed structure (Table I).

EXAMPLE 4

3-(N,N-Dimethylamino)-2-phenylacrylonitrile

A mixture of 5.2 g. (0.03 mole) of 3-ethoxy-2-phenylacrylonitrile and 25 ml of 40 percent aqueous dimethylamine in 60 ml of ethyl alcohol was allowed to react according to Example 1. Obtained was 3.1 g. of 3-(N,N-Dimethylamino)-2-phenylacrylonitrile with a melting point of 77°–77.5°C. IR analysis of the example compound verified the proposed structure (Table I).

EXAMPLE 5

3-(N,N-Dimethylamino)-2-(p-chlorophenyl)acrylonitrile

A mixture of 6.2 g. (0.03 mole) of 3-ethoxy-2-(p-chlorophenyl)acrylonitrile and 25 ml of 40 percent aqueous N,N-dimethylamine in 60 ml of ethyl alcohol was allowed to react according to Example 1. Obtained was 4.6 g. of 3-(N,N-Dimethylamino)-2-(p-chlorophenyl)acrylonitrile with a melting point of 91°–92 C. IR analysis of the example compound verified the proposed structure (Table 1).

EXAMPLE 6

3-(n-Butylamino)-2-(p-chlorophenyl)acrylonitrile

A mixture of 6.2 g. (0.03 mole) of 3-ethoxy-2-(p-chlorophenyl)acrylonitrile and 16.4 ml of a 40 percent aqueous n-butylamine in 60 ml of ethyl alcohol was allowed to react according to Example 1. Obtained was 4.6 g. of 3-(n-Butylamino)-2-(p-chlorophenyl)acrylonitrile with a melting point of 87°–88° C. IR analysis of the example compound verified the proposed structure (Table I).

EXAMPLE 7

3-Methylamino-2-(o-chlorophenyl)acrylonitrile

A mixture of 6.2 g. (0.03 mole) of 3-ethoxy-2-(o-chloro-phenyl)acrylonitrile and 25 ml of 40 percent aqueous methylamine in 60 ml of ethyl alcohol was allowed to react according to Example 1. Obtained was 4.1 g. of 3-methylamino-2-(o-chlorophenyl)acrylonitrile with a melting point of 90°–91° C. IR analysis of the example compound verified the proposed structure (Table I).

EXAMPLE 8

3-Allylamino-2-(p-chlorophenyl)acrylonitrile

A mixture of 6.2 g. (0.03 mole) of 3-ethoxy-2-(p-chlorophenyl)acrylonitrile and 25 ml of 40 percent aqueous allylamine in 60 ml of ethyl alcohol was allowed to react according to Example 1. Obtained was 5.4 g. of 3-allylamino-2-(p-chlorophenyl)acrylonitrile with a melting point of 98°–99° C. IR analysis of the example compound verified the proposed structure (Table I).

EXAMPLE 9

3-Pyrrolidinyl-2-phenylacrylonitrile

A mixture of 5.2 g. (0.03 mole) of 3-ethoxy-2-phenylacrylonitrile and 2.2 g. (0.03 mole) of pyrrolidine in 10 ml of water and 60 ml of ethyl alcohol was allowed to react according to Example 1. Obtained was 1.3 g. 3-pyrrolidinyl-2-phenylacrylonitrile with a melting point of 95°–96° C. IR analysis of the example compound verified the proposed structure (Table I).

EXAMPLE 10

3-Allylamino-2-(o-chlorophenyl)acrylonitrile

A mixture of 8.6 g. (0.04 mole) of 3-ethoxy-2-(o-chlorophenyl)acrylonitrile and 6.0 g. (0.1 mole) of allylamine in 10 ml of water and 160 ml of ethyl alcohol was allowed to react according to Example 1. Obtained was 5.8 g. of 3-allylamino-2-(o-chlorophenyl)acrylonitrile. IR analysis of the example compound verified the proposed structure (Table I).

TABLE I

IR Analysis Data For The Compounds of The Examples

| Compound of Example | $\lambda$(KBr), microns | | | | |
|---|---|---|---|---|---|
| 1 | 3.0(m), | 4.6(m), | 6.1(s), | 7.6(s), | 13.2(s) |
| 2 | 3.1(m), | 4.6(m), | 6.2(s), | 7.6(s), | 13.3(s) |
| 3 | 3.1(m), | 4.6(m), | 6.2(s), | 7.6(s), | 12.2(s) |
| 4 | 4.6(m), | 6.2(s), | 7.2(s), | 13.2(s) | |
| 5 | 4.6(m), | 6.2(s), | 7.2(s), | 12.2(s) | |
| 6 | 3.0(m), | 4.6(m), | 6.2(s), | 12.1(s) | |
| 7 | 3.1(m), | 4.6 (m), | 6.2(s), | 7.6(m), | 13.2(s) |
| 8 | 3.1(m), | 4.6(m), | 6.2(s), | 7.6(m), | 12.1(m) |
| 9 | 4.6(m), | 6.3(s), | 7.2(s), | 13.2(s) | |
| 10 | 3.0(m), | 4.6(m), | 6.2(s), | 13.3(s) | |

The 2-aryl-3-alkylamino acrylonitriles used in this invention were subjected to the following fungicidal test. The results are set forth in Table II following the test description.

FUNGICIDE TESTING METHOD

Soil Test

Four representative soil fungi, *Fusarium oxysporium*, *Pythium debaryanum*, *Rhizoctonia solani* and *Scleroti-*

*um rolfsii*, are maintained on potato dextrose agar in 20 × 150 mm. test tubes. Inoculum for the test is increased in a 1,000 ml. Erlenmeyer flask on a ¼ corn meal-¾ sand mixture (by volume). The medium is saturated with water and sterilized by autoclaving at 15 lbs. pressure for 20 minutes on 2 successive days. The medium is inoculated by transferring, aseptically, a small portion of mycelium from the test tube cultures 14 days prior to using for inoculum.

An inoculated medium for each of the four soil organisms is prepared as follows: A 14 day old 1,000 ml. flask of the corn meal-sand inoculum is used to inoculate 20,10 oz. cups of sterile soil by blending the inoculum and sterile soil for 10 minutes in the cement mixer.

The inoculated medium is then placed in 10 oz. wax treated cold drink cups (20 cups of each organism) and treated as follows: 150 mg. quantity of each candidate fungicide is weighed on the analytical balance and formulated using 10 ml. of acetone and 190 ml. of $H_2O$. If the compound is insoluble in acetone or water, 1.1 g. of Continental Clay, .1 g. of Marasperse N and 2 g. of Petro-BP is added and the mixture ground in the Waring blender for 3 minutes. Continental Clay is kaolinite clay, Marasperse N is sodium ligno sulfonate and Petro-BP is linear alkylnaphthalene sodium sulfonate. A 50 ml. quantity of each chemical formulation is used to drench 1 cup inoculated with each of the four fungal organisms. Immediately after the cups are drenched, they are placed in polyethylene bags (1 cup per bag) and held at 70° F. for 14 days.

After 10 days, each cup is examined for the presence of fungal growth and each compound rated for percent inhibition of fungal growth.

TABLE II

Fungicidal Activity (Percent Effectiveness) of 2-Aryl-3-alkylaminoacrylonitriles

| Compound of Example | Conc. of Compound, ppm | Fusarium Oxy-sporium | Pythium Deb-aryanum | Rhiz-octonia Solani | Scler-otium Rolfsii |
|---|---|---|---|---|---|
| 1 | 25 | 70 | 70 | 30 | 30 |
| 2 | 25 | 90 | 10 | 10 | 10 |
| 3 | 25 | 100 | 30 | 10 | 10 |
| 4 | 25 | 90 | 30 | 10 | 10 |
| 5 | 25 | 100 | 30 | 10 | 10 |
| 6 | 25 | 100 | 30 | 10 | 10 |
| 7 | 25 | 60 | 50 | 10 | 10 |
| 8 | 25 | 30 | 60 | 10 | 10 |
| 9 | 25 | 30 | 40 | 100 | 100 |
| 10 | 25 | 20 | 10 | 80 | 80 |

From the data in Table II, it will be noted that the 2-aryl-3-alkylaminoacrylonitriles used in the present invention have a good range of fungicidal activity. They are highly effective against *Fusarium oxysporium*, commonly known as Cotton Wilt, and against *Pythium debaryanum*, an important disease which causes seed decay, damping off and storage rot of cotton and many other plants. They also are effective against *Rhizoctonia solani* and *Sclerotium rolfsii*, damping-off organisms which reduce stands on practically all crops.

The compounds may be used in this invention in various ways to achieve fungicidal action. They can be applied as dusts, as liquid sprays, or as gas-propelled sprays, and can contain, in addition to a carrier, additives such as emulsifying agents, wetting agents, binding agents, gases compressed to the liquid state, odorants, stabilizers and the like. A wide variety of liquid and solid carriers can be used in the fungicidal compositions. Non-limiting examples of liquid carriers include water; organic solvents, such as alcohols, ketones, amides and esters; mineral oils, such as kerosene, light oils, and medium oils; and vegetable oils, such as cottonseed oil. Non-limiting examples of solid carriers include talc, bentonite, diatomaceous earth, pyrophyllite, fullers earth, gypsum, flours derived from cotton seeds and nut shells, and various natural and synthetic clays having a pH not exceeding about 9.5.

In order to achieve a broader spectrum of control, it is within the contemplation of this invention to include two or more 2-aryl-3-alkylaminoacrylonitrile derivatives in the fungicidal composition. The amount of the derivitives used in the fungicidal compositions will vary rather widely. It depends to some extent upon the type of composition in which the material is being used, the nature of the condition to be controlled, and the method of application. In the ultimate fungicidal composition, as applied in the field, fungicide concentration as low as 0.001 weight percent of the total composition can be used. In general, compositions, as applied, containing about 0.0005 weight percent fungicide in either liquid or solid carrier, give good results. In some cases, however, stronger dosages up to about 1 weight percent may be required.

In practice, fungicidal compositions are usually prepared in the form of concentrates, which are diluted in the field to the concentration desired for application. For example, the concentrate can be a wettable powder containing large amounts of fungicide, a carrier (e.g., attapulgite or other clay), and wetting and dispersing agents. Such powders can be diluted prior to the application by dispersing them in water to obtain a sprayable suspension containing the concentration of fungicide desired for application. Other concentrates can be solutions that can be later diluted, e.g., with kerosene. Thus, it is within the contemplation of this invention to provide fungicidal compositions containing up to about 80 percent, by weight of the composition, of fungicide. Accordingly, depending upon whether it is ready for application or it is in concentrated form, the contemplated fungicidal compositions contain between about 0.0001 percent and 80 percent, by weight of the composition of at least one fungicidal 2-aryl-3-alkylaminoacrylonitrile derivative and a carrier, liquid or solid, as defined hereinbefore.

Although the present invention has been described with preferred embodiments, it is to be understood that modifications and variations may be resorted to, without departing from the spirit and scope of this invention, as those skilled in the art will readily understand.

What is claimed is:

1. A method for combatting fungi which comprises applying to said fungi a fungicidally effective amount of a compound having the formula:

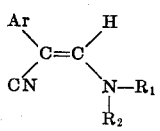

wherein Ar is a member selected from the group consisting of phenyl and chlorophenyl, $R_1$ is a member selected from the group consisting of hydrogen and lower alkyl, and $R_2$ is a member selected from the group consisting of lower alkyl and lower alkenyl.

2. A method for combatting fungi, as defined in claim 1, wherein the fungicidally effective compound has the formula:

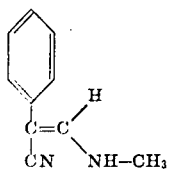

3. A method for combatting fungi, as defined in claim 1, wherein the fungicidally effective compound has the formula:

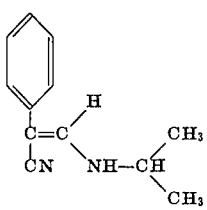

4. A method for combatting fungi, as defined in claim 1, wherein the fungicidally effective compound has the formula:

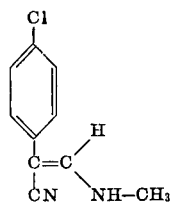

5. A method for combatting fungi, as defined in claim 1, wherein the fungicidally effective compound has the formula:

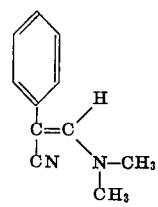

6. A method for combatting fungi, as defined in claim 1, wherein the fungicidally effective compound has the formula:

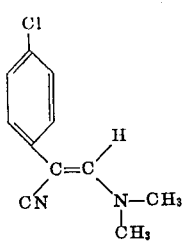

7. A method for combatting fungi, as defined in claim 1, wherein the fungicidally effective compound has the formula:

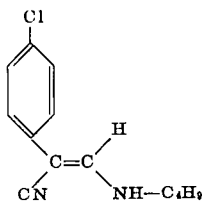

8. A method for combatting fungi, as defined in claim 1, wherein the fungicidally effective compound has the formula:

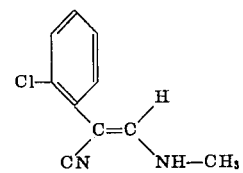

9. A method for combatting fungi, as defined in claim 1, wherein the fungicidally effective compound has the formula:

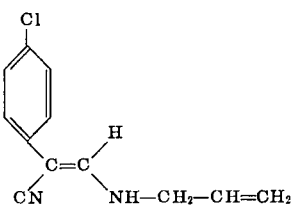

10. A method for combatting fungi, as defined in claim 1, wherein the fungicidally effective compound has the formula:

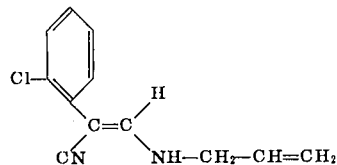

11. A fungicidal composition comprising a fungicidally effective amount of from about 0.0001 percent to about 80 percent, by weight of said composition, of the compound of claim 1 and a solid carrier therefor.

12. A fungicidal composition comprising a fungicidally effective amount of from about 0.0001 percent to about 80 percent, by weight of said composition, of the compound of claim 2 and a solid carrier therefor.

13. A fungicidal composition comprising a fungicidally effective amount of from about 0.0001 percent to about 80 percent, by weight of said composition, of the compound of claim 3 and a solid carrier therefor.

14. A fungicidal composition comprising a fungicidally effective amount of from about 0.0001 percent to about 80 percent, by weight of said composition, of the compound of claim 4 and a solid carrier therefor.

15. A fungicidal composition comprising a fungicidally effective amount of from about 0.0001 percent to about 80 percent, by weight of said composition, of the compound of claim 5 and a solid carrier therefor.

16. A fungicidal composition comprising a fungicidally effective amount of from about 0.0001 percent to about 80 percent, by weight of said composition, of the compound of claim 6 and a solid carrier therefor.

17. A fungicidal composition comprising a fungicidally effective amount of from about 0.0001 percent to about 80 percent, by weight of said composition, of the compound of claim 7 and a solid carrier therefor.

18. A fungicidal composition comprising a fungicidally effective amount of from about 0.0001 percent to about 80 percent, by weight of said composition, of the compound of claim 8 and a solid carrier therefor.

19. A fungicidal composition comprising a fungicidally effective amount of from about 0.0001 percent to about 80 percent, by weight of said composition, of the compound of claim 10 and a solid carrier therefor.

20. A fungicidal composition comprising a fungicidally effective amount of from about 0.0001 percent to about 80 percent, by weight of said composition, of the compound of claim 10 and a solid carrier therefor.

* * * * *